United States Patent [19]

Lobel

[11] Patent Number: 5,349,701
[45] Date of Patent: Sep. 20, 1994

[54] METHOD AND APPARATUS FOR BROKEN LINK DETECT USING AUDIO ENERGY LEVEL

[75] Inventor: Gary S. Lobel, Boynton Beach, Fla.

[73] Assignee: Motorola, Inc., Schaumburg, Ill.

[21] Appl. No.: 822,033

[22] Filed: Jan. 15, 1992

[51] Int. Cl.$^5$ .................................................. H04B 1/10
[52] U.S. Cl. .................................. 455/222; 455/212; 455/226.2; 375/104
[58] Field of Search ............... 455/222, 223, 224, 225, 455/278.1, 218, 212, 221, 229, 67.1, 67.7, 219, 226.1, 226.2, 226.3, 226.4; 379/26, 33; 375/104

[56] References Cited

U.S. PATENT DOCUMENTS

| | | | |
|---|---|---|---|
| 3,978,412 | 8/1976 | Frerking | 455/222 |
| 4,032,723 | 6/1977 | Mendoza | 455/229 |
| 4,684,989 | 8/1987 | Roeder et al. | 455/222 |
| 4,788,692 | 11/1988 | Takebayashi et al. | 375/27 |
| 4,811,404 | 3/1989 | Vilmur et al. | 381/94 |
| 5,161,185 | 11/1992 | Hochschild | 455/222 |
| 5,193,216 | 3/1993 | Davis | 455/67.7 |

FOREIGN PATENT DOCUMENTS 0146139 8/1983 Japan .................. 455/223
2218548A 11/1989 United Kingdom .

OTHER PUBLICATIONS

Bob Eldrige, 2-Way Mobile Squelch Problems, Feb. 1959, 72.

Primary Examiner—Reinhard J. Eisenzopf
Assistant Examiner—Chi Pham
Attorney, Agent, or Firm—Thomas G. Berry; Michael J. DeLuca

[57] ABSTRACT

A noise detector (56, 56'), suitable for use in a radio frequency (RF) communications device, such as a CT-2 base station (12) or handset (20), detects a broken RF link by sampling the energy level of a signal for a short period of time. Thus, the audio signal output to a telco interface (40) of the base station (12) or the speaker (60) of the handset (20) can be muted by a signal from the controller (48, 48') in response to broken link detect by the noise detector (56, 56'). The radio communications device (12, 20) receives an RF signal via receiver circuitry (50, 50b), samples (106, 114, 116) the received signal over a predetermined time period (N) to measure a plurality of signal energy levels (112), and determines whether the RF link is broken or not in response to an average of the plurality of signal energy levels exceeding or not exceeding a predetermined threshold (118).

9 Claims, 4 Drawing Sheets

METHOD AND APPARATUS FOR BROKEN LINK DETECT USING AUDIO ENERGY LEVEL

CROSS REFERENCE TO RELATED, COPENDING APPLICATION

A related, copending application is patent application Ser. No. 07/821,111, filed concurrently herewith, by Jose Corleto, Luis Bonet, and David Yatim, and assigned to the assignee hereof, entitled "Method and Apparatus for Noise Burst Detection in a Signal Processor".

FIELD OF THE INVENTION

This invention relates in general to radio communications, and in particular to a method and apparatus for detection of a broken radio frequency link.

BACKGROUND OF THE INVENTION

The second generation cordless telephone (CT-2) Common Air Interface (CAI) describes the protocol for transmitting and receiving digitized audio and data for second generation cordless telephones. A CT-2 handset receives an analog speech signal via a microphone, converts the analog speech signal into a digital speech signal, compresses the digital speech signal, modulates the compressed signal at a radio frequency, and transmits the modulated RF signal through an antenna. The transmitted RF signal is received by a nearby base station where it may be converted to an analog signal or remain in digital form for digital switching equipment. Ultimately, the signal is relayed to the destination telephone. When a similar signal is received from the destination telephone, the telephone signal undergoes the same process in reverse. The base station transmits a digital RF signal to the handset which is received via the antenna demodulated, decompressed, and converted into an speech signal which drives a speaker in the handset.

The data is transmitted in one millisecond every two milliseconds with each frame containing four-bit adaptive differential pulse code modulated (ADPCM) samples and either two or four bits of data. Transmit and receive signals are sent and received to and from the base station in packets in a ping-pong fashion. CAI specifies that a part of the packet includes signalling information including such things as call setup and termination requests and handshaking information. For signal reception, a packet is received, demodulated, processed through a ADPCM decoder, converted from PCM to analog, and then provided to a speaker.

In the CT-2 cordless telephone system, the handset establishes a digital link with the base station. The link is normally maintained until the call is In some cases, the link may be lost or broken between handset and the base station during the call. For example, if the user moves the handset outside of range of the base station, then the link may be lost. The result is that a high level of white noise is provided the speaker due to the randomness of the received until the broken link is detected and the noise is muted The noise is extremely disturbing to the user at both the conventional telephone or the handset earpiece.

Normal analog systems rely on receive signal strength detection to squelch the audio circuits. Unfortunately, in digital systems such as CT-2, loss of carrier is not the only source of lost data. In addition, loss of frame synchronization will also cause the link (and the data) to be lost. Frame synchronization of the received signal is established only at the time of linkup. Once the link is established, the link is lost if sync is lost. If synchronization is lost, the received data becomes meaningless and random. Since data, though random and meaningless, is received, the use of carrier detect as squelch control is precluded because loss of synchronization may occur during acceptable signal strength levels. Random data received by an ADPCM codec to convert a signal to analog audio will translate as white noise at a level typically about 3 dB to 6 dB below the maximum level.

Presently, the only method which the CAI protocol uses to detect loss of link is the lack of a handshake message. Intervals in the transmission of handshake be as long as several seconds. One way to lessen the detection time is to force periodic communication between the base station and the handset, which results in a reduction in detection time to several hundred milliseconds. Even then, a user may hear a loud noise when the link is broken. Forced 'D' (control) channel communication will give muting interval times on the order of hundreds of milliseconds. This is due to the fact that codewords are 80 bits in length and transmitted at 1 kbit/sec (mux 1.2) or 80 msec/codeword. Since a single bit will render the codeword invalid (CRC error), the algorithm would require a minimum of two to three codewords lost before muting (bit errors of 1% to 2% would cause only a slight clicking noise in the audio channel).

Thus, what is needed is a noise detector suitable for use in an RF communications device for quickly detecting a broken RF link so that audio output from the RF communications device can be muted with a minimum of audio noise.

SUMMARY OF THE INVENTION

In carrying out the objects of the invention in one form, there is provided a radio communications device for receiving a radio frequency (RF) signal via an RF link. The radio communications device comprises receiving means for receiving the RF signal, signal sampling means coupled to the receiving means for sampling the received signal over a predetermined time period to measure a plurality of signal energy levels, and determining means coupled to the signal sampling means for determining whether the RF link is broken or not in response to an average of the plurality of signal energy levels exceeding or not exceeding a predetermined threshold.

DETAILED DESCRIPTION OF THE INVENTION

Figure 1:
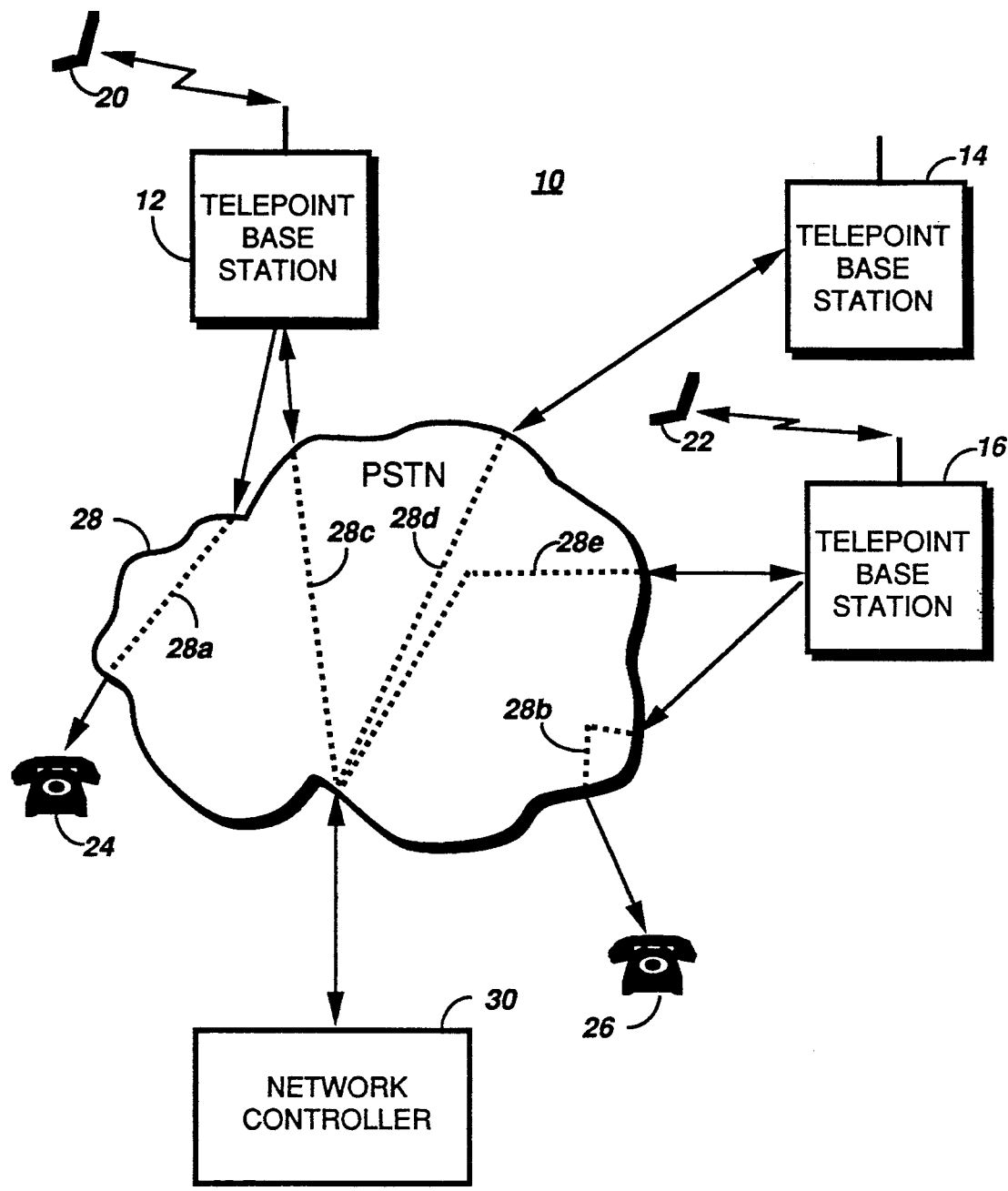
FIG. 1 is a diagram of a cordless telephone communications system in accordance with the present invention.

Referring to FIG. 1, a CT-2 (second generation cordless telephone) communication system 10 comprises multiple telepoint base stations 12, 14, 16, for allowing CT-2 handsets 20, 22 to place calls. The calls are routed to conventional telephones 24, 26 through connections 28a, 28b established through the public switched telephone network 28. For maintenance of the CT-2 communication system 10 and for billing of calls made by the handsets 20, 22, a network controller 30 communicates with the telepoint base stations 12, 14, and 16 via connections 28c, 28d, and 28e, respectively, established through the public switched telephone network 28.

Figure 2:
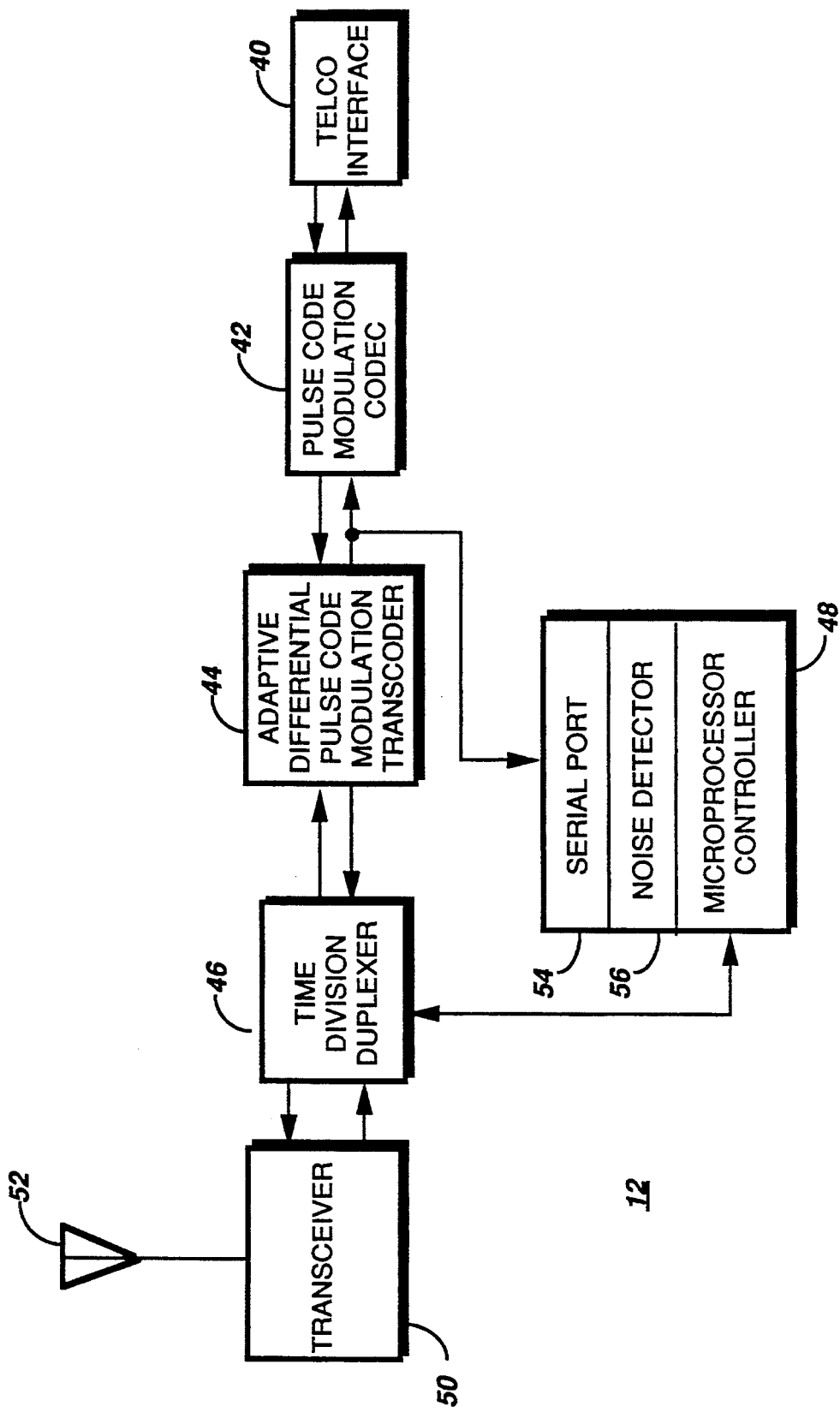
FIG. 2 is a block diagram of a base station of the cordless telephone communications system of FIG. 1 in accordance with the present invention.

Referring next to FIG. 2, the CT-2 base station 12 according to the present invention is shown. According to the CT-2 protocol, telephone signals are received and transmitted digitally in packets in a half-duplex or ping-pong scheme between the handsets 20, 22 (FIG. 1) and the base station 12. As used here, the term "signal" refers to a time-varying electrical signal, and the term "digital signal" refers to a series of digital samples of the signal. A "packet" includes a portion of the digital signal, or alternatively, a specified number of digital samples of the telephone signal, along with digital signalling bits.

A telco interface 40 is coupled to the public switched telephone network (PSTN) 28 (FIG. 1) for transmitting an analog signal thereto and for receiving an analog telephone signal therefrom. The telco interface 40 is coupled to a pulse code modulation (PCM) codec 42. The PCM codec 42 for converting the analog signal received from the telco interface 40 to a digital signal and, conversely, converts a digital PCM signal to analog format. Functionally, the PCM codec 42 includes (a) an analog-to-digital converter (ADC) and bandpass filters for converting an analog telephone signal received from the telco interface 40 to a digital signal in the PCM format, and (b) a digital-to-analog converter (DAC) and lowpass filters for converting a digital signal to an analog telephone signal for provision to the telco interface 40. The PCM codec 42 provides the digital signal in PCM format to an ADPCM transcoder 44. The adaptive differential pulse code modulation (ADPCM) encoder/decoder 44 also includes two portions. The first portion of the ADPCM 44 is an ADPCM encoder for compressing the 64 kbps digital telephone signal to a 32 kbps ADPCM signal according to the G.721 standard specified by the CCITT. The 32 kbps ADPCM signal is provided from the ADPCM 44 to a time division duplexer 46. The time division duplexer 46 combines signalling bits from a microprocessor controller 48 with the compressed digital data from the ADPCM transcoder 44 to form a CT-2 packet. The time division duplexer 46 provides the CT-2 packet to a radio transceiver 50 which modulates the signal and provides it as an RF signal to an antenna 52 for transmission to the handsets 20, 22 (FIG. 1). The modulation scheme is a two-level FSK shaped by an approximately Gaussian filter, as described in the CT-2 CAI Specification.

For reception, a packet from the base station is received as a modulated RF signal on the antenna 52. The transceiver 50 receives the RF signal and demodulates it to produce CT-2 packets. The packets are presented to the time division duplexer 46 which splits the packet into its two constituent components: signalling bits and a compressed digital signal. The time division duplexer 46 makes the signalling bits available to the microprocessor controller 48 and makes the compressed digital signal available to the second portion of the ADPCM transcoder 44, an ADPCM decoder. The controller 48 reads the signalling bits and performs associated conventional signalling functions in response thereto. The ADPCM decoder portion of the ADPCM 44 decompresses the compressed digital signal received from time division duplexer 46 in accordance with CCITT Recommendation G.721. The ADPCM transcoder converts the 32 kbps ADPCM digital signal to a 64 kbps PCM signal according to standard G.721. The PCM codec 42 converts the 64 kbps PCM signal to an analog signal. The analog signal is presented to the telco interface 40.

In accordance with the present invention, the controller 48 comprises a serial port 54 coupled to the receive path output of the ADPCM 44 for sampling the decompressed analog signal. The analog signal is provided by the serial port 54 to a noise detector 56. The noise detector 56 compares the average energy level of the received signal to a threshold to detect a broken RF link. If the average energy level over a predetermined period exceeds the threshold, then it is possible to conclude that the RF link has been broken. The output to the telco interface 40 is muted by the controller 48 signalling the time division duplexer 46 on the control signal line to mute the received signal path in response to the noise detector 56 detecting a broken link.

Figure 3:
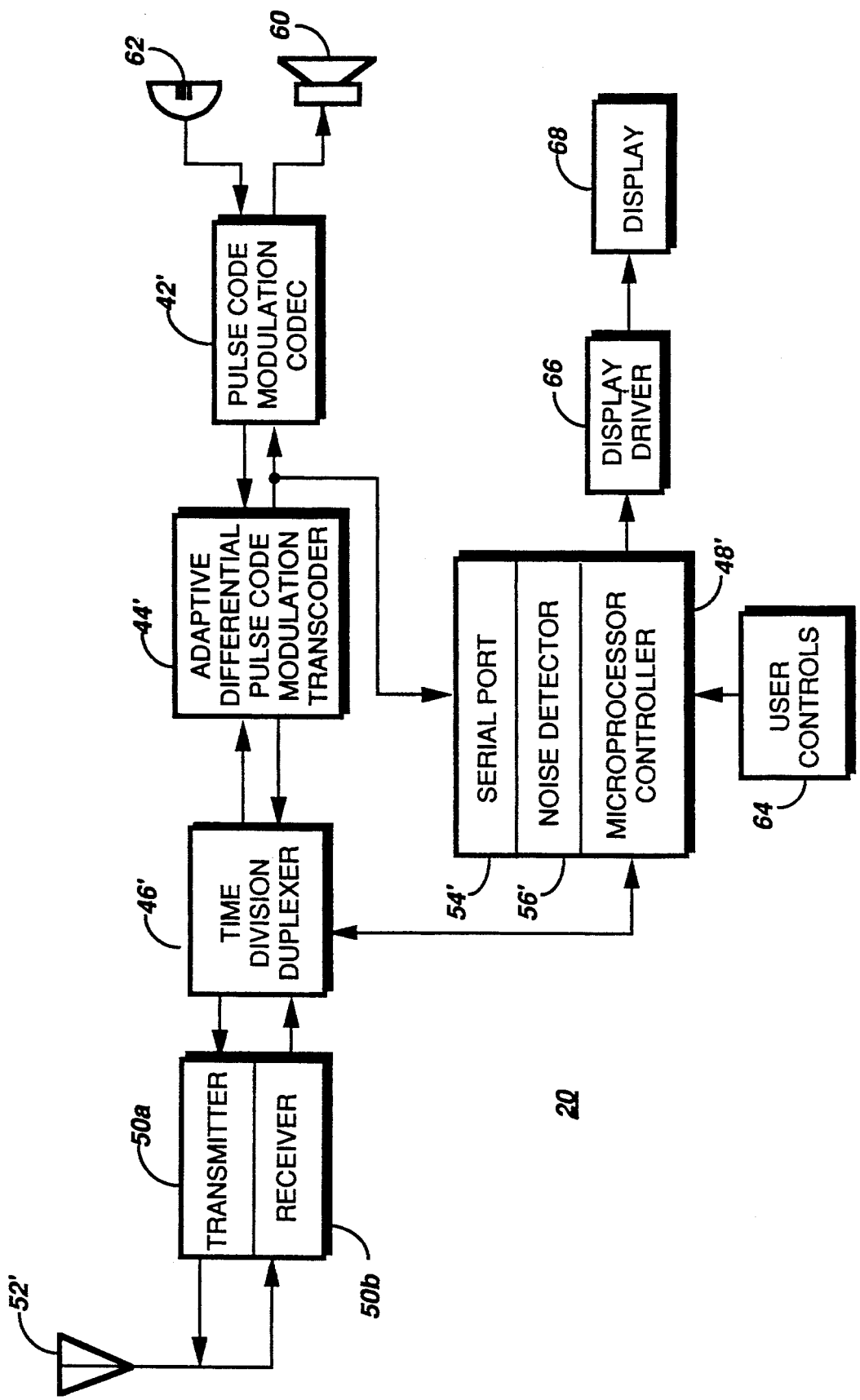
FIG. 3 is a block diagram of a cordless telephone handset of the communications system of FIG. 1 in accordance with the present invention.

Referring to FIG. 3, a block diagram of a handset 20 constructed in accordance with the present invention is shown. The handset 20 is constructed similarly to the base station 12 and may comprise similar components. Signals from the base station 12 (FIG. 1) are received by the antenna 52' and provided to a receiver 50a. The receiver 50a demodulates the received signal and provides it to the time division duplexer (TDD) 46'. The TDD 46' reconstructs the control signalling and the digital signal components of the received signal for presentation to the controller 48' and the ADPCM transcoder 44', respectively. The controller 48' reads the signalling bits and performs associated signalling functions, such as call setup and disconnect. The ADPCM 44' decompresses the digital signal and provides it to the PCM codec 42' for conversion to an analog signal. The analog signal is provided to a speaker 60 of the handset 20 for audio output therefrom.

For voice transmission from the CT-2 handset 20, a microphone 62 is coupled to the PCM codec 42' for providing an analog signal thereto. The transmission path processes the signal through the PCM codec 42', the ADPCM transcoder 44', the TDD 46', and the transmitter 50b for RF transmission from the antenna 52'. In accordance with the present invention, the controller 48' of the CT-2 handset 20 comprises the serial port 54' coupled to the output of the ADPCM transcoder 44' and the noise detector 56' for sampling the received signal to detect a broken RF link.

For other operations, such as dialling up a telephone number, user controls 64 provide appropriate signals to the microprocessor controller 48'. In addition, the microprocessor controller 48' may supply a signal to a display driver 66 for generation of a visual message for presentation to the user on a display 68.

In accordance with the present invention, the noise detector 56 and 56' of the base station 12 and the handset 20, respectively, are constructed similarly. The noise detector 56 receives the reconstructed signal $s_r(k)$ from the serial port 54 and three parameters: a number of samples which will be included in the energy computation labelled "N", an energy threshold value labelled "$NE_{TH}$", and a noise detection enable labelled "ND". The controller 48 provides parameters N, $NE_{TH}$, and ND to the noise detector 56. The noise detector 56 provides a noise indication labelled "NOISE" to the controller 48 in response to the average energy of $s_r(k)$, labelled "$E_{AVE}$", exceeding a predetermined threshold, labelled "$E_{TH}$". One way of performing this energy calculation is to approximate $E_{AVE}$ by adding the absolute value of signal $s_r(k)$ over N sample periods, and then divide the result by N, which is expressed as:

$$E_{AVE} = (1/N) \, (\Sigma |s_r(k)|) \quad [1]$$

where "$\Sigma$" represents the summation operator, and where the summing interval is from (k=0) to (k=N−1). The average power calculation can also be done without a divide instruction for decreased processing time if the total energy, instead of the average energy, is computed. The noise detector 56 of the preferred embodiment of the present invention activates NOISE (i.e., NOISE=1) if the energy over N samples, labelled "$NE_{AVE}$", exceeds $NE_{TH}$. This formula is expressed mathematically as:

$$IF(NE_{AVE} = \Sigma |s_r(k)| > NE_{TH}) \; THEN \; (NOISE = 1) \quad [2]$$

where, as before, the summing interval is from (k=0) to (k=N−1). Since the number of samples N and an average energy threshold may be determined in advance, their product $NE_{TH}$ is known. The microprocessor controller 48 provides $NE_{TH}$ to the noise detector 56, which performs the average energy estimation of equation 2 and provides NOISE accordingly. In response to the activation of NOISE, the controller 48 attenuates or mutes the received signal. The muting may occur in the TDD 46, the ADPCM transcoder 44, the PCM codec 42, or directly to the signal provided to the telco interface 40. In the preferred embodiment, the controller 48 utilizes the control signalling line to provide a noise indication signal to the TDD 46 to mute the received signal.

Figure 4:
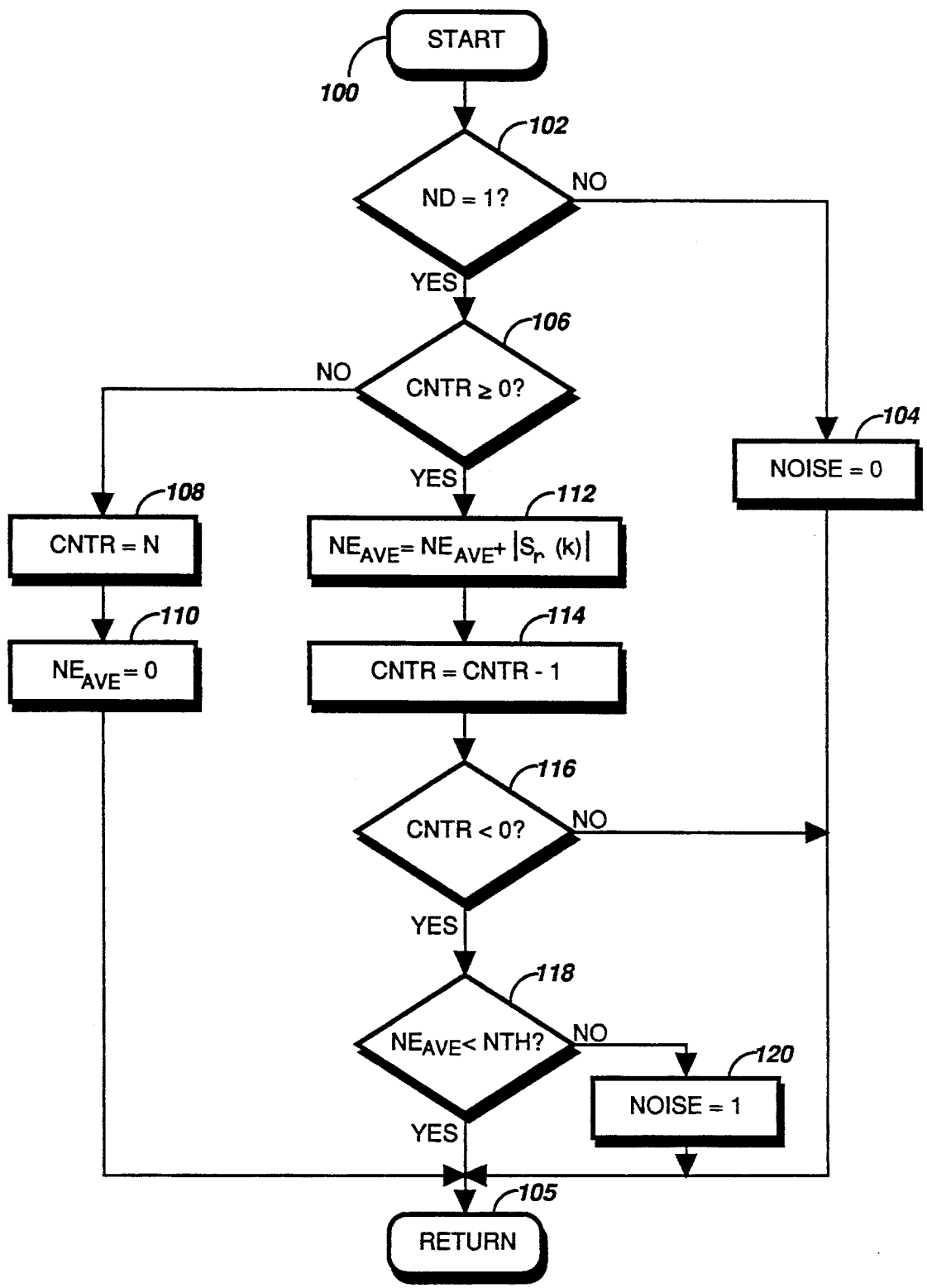
FIG. 4 is a flowchart of the operation of the noise detector of FIG. 2 and FIG. 3 in accordance with the present invention.

FIG. 4 illustrates a flow chart in accordance with and illustrating the method of the present invention. The flow chart of FIG. 4 implements the noise detector 56 of FIG. 2 and the noise detector 56' of FIG. 3. The noise detector 56 starts 100 execution of the noise detection routine by checking, at step 102, whether a noise detection control bit, labelled "ND", is set to one. If ND is not set to one, then noise detector 56 is disabled, NOISE is cleared at step 104 and program flow is returned 105 to wait for the controller 48 to next instruct it to start noise detection. If ND is set, then a counter variable labelled "CNTR" is checked at step 106. CNTR is an internal variable that keeps track of how many values of $|s_r(k)|$ remain to be accumulated. CNTR is set to −1 upon power-up and reset of the controller 48. If ND=1 (enabled), and CNTR is negative, then CNTR is initialized to N, the number of samples of $|s_r(k)|$ that will be used in the energy calculation, at step 108. Internal variable $NE_{AVE}$, which represents the total energy estimate over N samples, is initialized to zero at step 110.

On the following sample, a positive value of CNTR is detected at step 106, $|s_r(k)|$ is added to the value of $NE_{AVE}$ at step 112, and CNTR is decremented at step 114. CNTR is again tested at step 116 to determine if it is negative. Steps 112, 114, and 116 are repeated for each sample until CNTR is decremented to −1. When CNTR is decremented to −1, $NE_{AVE}$ represents an estimate of the total energy for the time interval defined by the sample interval times N. For G.721 32 kbps ADPCM, the sample interval is 125 microseconds ($\mu$sec), and thus $NE_{AVE}$ represents an estimate of the total energy in the signal over an (N)*(125 $\mu$sec) interval. $NE_{AVE}$ is compared to $NE_{TH}$ at step 118. If $NE_{AVE}$ is not less than $NE_{TH}$, then NOISE is set at step 120.

Different ways of implementing the algorithm are also possible. The flow chart of FIG. 4 illustrates a decrementing sample counter. It is also possible to initialize an incrementing sample counter to zero and then to compare the value of $NE_{AVE}$ to $NE_{TH}$ when the counter reaches N. Also, NOISE was set in response to a false result of a test whether $NE_{AVE}$ is less than $NE_{TH}$ at step 59. In another embodiment, NOISE could be set in response to a true result of a test of whether $NE_{AVE}$ is greater than $NE_{TH}$.

By now it should be appreciated that there has been provided a noise detector 56 suitable for use in an RF communications device, such as a CT-2 handset 20 or base station 12. The noise detector 56 can quickly detect a broken RF link by sampling the energy level of the received signal for a short period of time. Thus, the audio signal output to the speaker 60 or the telco interface 40 can be muted by a signal from the controller 48 in response to broken link detect by the noise detector 56 with a minimum of audio noise output.

I claim:

1. A radio communications device for receiving a radio frequency (RF) signal via an RF link, the radio communications device comprising:
   receiving means for receiving the RF signal;
   signal sampling means coupled to the receiving means for sampling the received signal over a predetermined time period to measure a plurality of signal energy levels;
   determining means coupled to the signal sampling means for determining whether the RF link is broken or not in response to an average of the plurality of signal energy levels exceeding or not exceeding a predetermined threshold; and
   control means coupled to the determining means for generating a noise indication signal in response to the average of the plurality of signal energy levels exceeding the predetermined threshold; and
   audio output means coupled to the receiving means and the control means for presenting audible output in response to the received signal if no noise indication signal is generated by the control means.

2. The radio communications device of claim 1 further wherein said audio output means presents no audible output if the noise indication signal is generated by the control means.

3. The radio communications device of claim 1 further comprising analog signal generation means coupled to the receiving means and to the control means for presenting an analog signal in response to the noise indication signal being generated by the control means and for presenting no audible output in response to the noise indication signal being generated by the control means.

4. The radio communications device of claim 1 further comprising a serial input means coupled to the receiving means for reconstructing a signal $s_r(k)$ in response to the received signal and for providing the signal $s_r(k)$ to the signal sampling means, and wherein the signal sampling means receives said signal $s_r(k)$ and calculates a total energy estimate of said signal $s_r(k)$ sampled once for each of a predetermined number of received samples of a plurality of received samples, and wherein said determining means determines if the average of the plurality of signal energy levels exceeds the predetermined threshold by determining if the total energy estimate exceeds a product of said predetermined threshold and said predetermined number of received samples.

5. The radio communications device of claim 1 wherein the radio communications device is a base station for providing two-way radio frequency (RF) communications therewith.

6. The radio communications device of claim 1 wherein the radio communications device is a cordless telephone handset.

7. The radio communications device of claim 3 wherein the analog signal is an analog telephone signal for presenting to a public switched telephone network.

8. A method for noise burst detection in a radio communications device for receiving a radio frequency (RF) signal having data modulated thereon, the modulated data having a variable signal energy level, the method comprising the steps of:

receiving the RF signal;

initializing a total energy estimate to zero;

sampling the signal energy level of the data modulated on the received RF signal;

adding an absolute value of the signal energy level of the sampled received RF signal to said total energy estimate;

repeating the steps of sampling and adding a predetermined number of times; and providing a noise indication if said total energy estimate exceeds a predetermined threshold.

9. The method of claim 8 wherein the predetermined threshold corresponds to a product of said predetermined number and an energy threshold.

* * * * *